United States Patent [19]
Morita et al.

[11] Patent Number: 4,487,277
[45] Date of Patent: Dec. 11, 1984

[54] CONTAINER DISTRIBUTING AND CHARGING APPARATUS

[75] Inventors: Souji Morita, Shiga; Yoshiharu Mikami, Kyoto, both of Japan

[73] Assignee: Kabushiki Kaisha Ishida Koki Seisakusho, Kyoto, Japan

[21] Appl. No.: 416,324

[22] Filed: Sep. 9, 1982

[30] Foreign Application Priority Data

Sep. 11, 1981 [JP] Japan .................. 56-144533

[51] Int. Cl.³ ............ G01G 13/24; G01G 19/00; G01G 19/22
[52] U.S. Cl. ........................ 177/25; 177/57; 177/145
[58] Field of Search ............ 177/25, 145, 57; 209/596; 198/504, 505, 420

[56] References Cited

U.S. PATENT DOCUMENTS

| 1,872,686 | 9/1928 | Cundall . | |
| 3,106,277 | 10/1963 | Nowak | 193/25 |
| 4,122,941 | 10/1978 | Giles et al. | 198/505 |
| 4,442,910 | 4/1984 | Mikami | 177/25 |

Primary Examiner—E. A. Goldberg
Assistant Examiner—Patrick W. Foster
Attorney, Agent, or Firm—Staas & Halsey

[57] ABSTRACT

A container distributing and charging apparatus has a plurality of weighing machines for computing weights of articles supplied to the weighing machines, selecting a combination of articles the total weight of which is equal to or closest to a target weight, and discharging the selected articles. One of containers which contain articles to be weighed and are ready for being supplied onto the weighing machines serves as a dummy container for taking up a dimensional difference between the containers and the weighing machines.

8 Claims, 3 Drawing Figures

CONTAINER DISTRIBUTING AND CHARGING APPARATUS

BACKGROUND OF THE INVENTION

The present invention relates to a container distributing and charging apparatus for charging, without mutual interference, an array of containers containing articles to be weighed into spaced positions above a plurality of weighing machines of an automatic combinatorial weighing apparatus for effecting a combinatorial weighing operation based on weight values obtained by the weighing machines.

Automatic combinatorial weighing apparatus have a plurality of weighing machines for computing weights of articles supplied to the weighing machines, selecting a combination of weighing machines weighing articles the total weight of which is equal to or closest to a predetermined target weight, discharging the articles from the selected weighing machines, and then supplying a new group of articles onto those weighing machines from which the previous articles have been discharged for a next combinatorial weighing operation. Such automatic combinatorial weighing apparatus find widespread use for weighing various articles as they have a better weighing accuracy and will operate at a higher rate than weighing apparatus having a single weighing machine for weighing articles controlled in an amount supplied to the weighing machine.

With the automatic combinatorial weighing apparatus, articles need to be discharged from selected weighing machines, and next articles are required to be distributed and supplied from a certain place of supply to the selected weighing machines from which the articles have been discharged. Various apparatus are known for distributing and supplying articles from a certain location, the examples being an apparatus having radial troughs and an apparatus having a distribution bowl. These known apparatus have sufficient functions and serve to improve the operation efficiency of the automatic weighing apparatus to a large degree. However, articles which can be handled by the prior apparatus are limited to those available in the form of flowable particles, powder or lumps which can be distributed and charged vibratably into the automatic weighing apparatus. Articles which are sticky and less flowable, such as pickles, meat, or dried cuttlefish cannot be handled by such known apparatus, as they are difficult to distribute and supply vibratably.

The applicant has proposed an apparatus having containers for containing a suitable amount or number of articles difficult to transport vibratably, the containers being selectively distributed and supplied from a location of supply onto weighing machines. The containers after the articles have been weighed are discharged from the weighing machines, and the articles are discharged from the containers at another location.

In the combinatorial weighing apparatus, weighing machines are selected at random in each weighing operation, and hence containers for a next weighing operation are charged into randomly selection positions.

The proposed apparatus includes a stock conveyor disposed alongside of the weighing machines of the automatic weighing apparatus for supporting thereon an array of containers corresponding in position to the weighing machines, respectively, in order to charge containers sideways onto selected weighing machines, so that the containers containing articles therein can be charged onto desired weighing machines immediately upon demand from the automatic weighing apparatus. After the containers have been charged, new containers are added to those left on the stock conveyor in spaced relation until another array of containers is formed in preparation for a next charging operation. The containers are arrayed on the stock conveyor successively in abutting relation by being pushed together. The weighing machines of the automatic weighing apparatus are spaced at equal intervals to prevent weighing errors which would otherwise be caused by interference between the containers on the adjacent weighing machines during a weighing operation. As a result, the containers on the stock conveyors are not necessarily arranged along a straight line along the array of weighing machines. It is therefore necessary that the containers be spaced from adjacent ones at suitable spacings or distributed properly when to be charged, and simultaneously be charged sideways onto the weighing machines.

One conventional means for spacing the containers comprises guides disposed between the weighing machines and the stock conveyor for causing the containers to be distributed along the guides onto the corresponding weighing machines. According to another container spacing means, the containers on the stock conveyor are positively moved slightly for distribution into normal positions at suitable intervals prior to being charged onto the weighing machines, and after selected containers have been charged, the remaining containers are brought into abutting relation and new containers are added thereto.

With the former known arrangement, however, the spacings between the weighing machines and the containers become progressively larger at ends of their arrays as there are more weighing machines and containers provided. The apparatus is thus subjected to undue mechanical burdens and thus practically unfeasible. The latter apparatus is advantageous in that the containers no matter how many they are can reliably be spaced, but disadvantageous in that it will take an increased period of time to space apart and bring together the containers, and the operation efficiency cannot be improved.

SUMMARY OF THE INVENTION

It is an object of the present invention to provide a container distributing and charging apparatus capable of reliably charging containers on a stock conveyor onto respective weighing machines.

Another object of the present invention is to provide a container distributing and charging apparatus for placing a dummy container in a series of containers on a stock conveyor for reliable charging of the containers to be weighed respectively onto weighing machines.

According to the present invention, a container distributing and charging apparatus comprises a plurality of weighing machines arrayed at equal intervals, and a stock table disposed alongside of the weighing machines for supporting an array of containers in abutting relation with articles contained therein. The containers are guided in mutually spaced relation from the stock table onto those weighing machines which are selected as a result of a combinatorial weighing operation for previously charged containers. The containers are charged from the stock table into positions above the selected weighing machines to thereby discharge the weighed containers therefrom. At least one of the containers serves as a dummy container which is kept from being charged into the positions above the weighing machines.

Other features and advantages of the invention will be apparent from the following description taken in connection with the accompanying drawings.

DESCRIPTION OF THE PREFERRED EMBODIMENT

An automatic combinatorial weighing apparatus having ten weighing machines arranged along a straight line according to the present invention will now be described with reference to the drawings.

Figure 1:
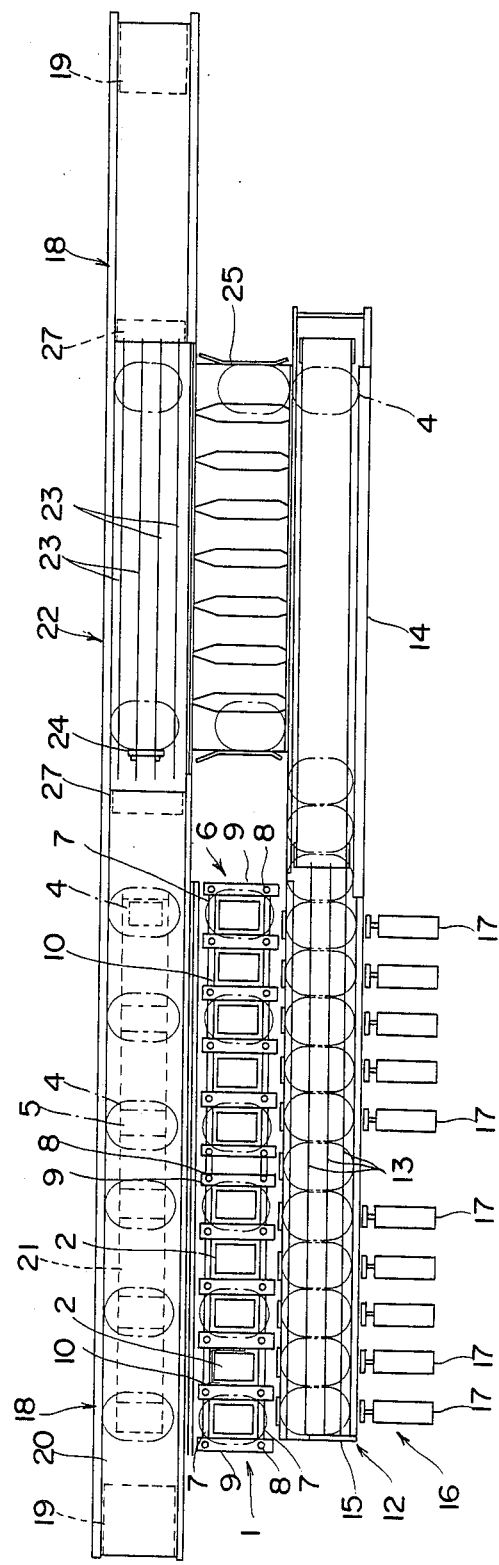
FIG. 1 is a plan view of a combination of a container distributing and charging apparatus and an automatic combinatorial weighing apparatus in accordance with the present invention.
Figure 2:
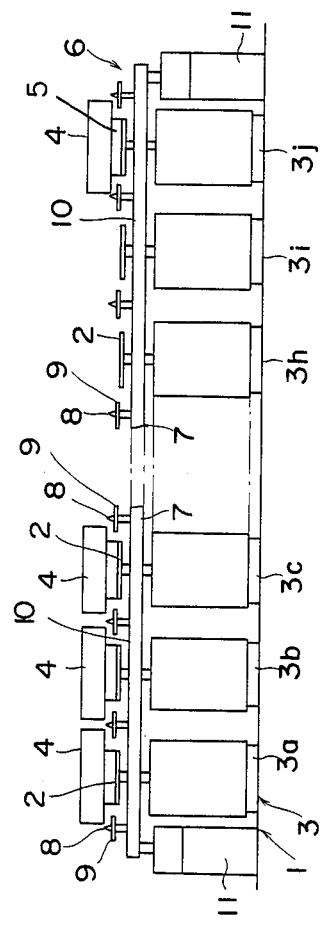
FIG. 2 is a side elevational view of the automatic combinatorial weighing apparatus shown in FIG. 2.
Figure 3:
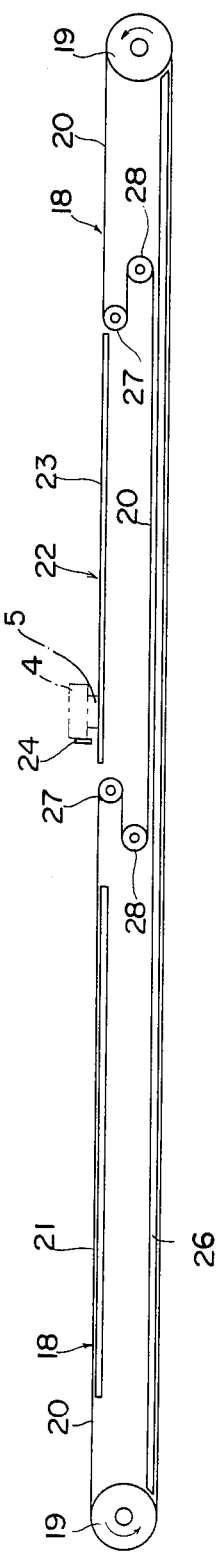
FIG. 3 is a side elevational view of a discharge conveyor.

In FIGS. 1 through 3, an automatic combinatorial weighing apparatus 1 includes a plurality of weighing machines 3 (ten weighing machines, for example) spaced at suitable intervals and arranged along a straight line and having weighing saucers 2 having flat upper surfaces. The ten weighing machines are grouped into a front five weighing machines 3a–3e and a rear five weighing machines 3f–3j, the weighing machines in each group being spaced at equal intervals. The fifth weighing machine 3e and the sixth weighing machine 3f are spaced from each other by a wide distance or alignment distance which is so small that a single weighing machine of the same size will not be located therein. Each weighing machine 3 is connected to an electronic arithmetic processor (not shown) for transmitting weight values to the arithmetic processer, in which combinatorial arithmetic operations are effected on the basis of the weight values. Containers 4 serve to hold a suitable amount or number of articles such as meat, pickles, or dried cuttlefish (not shown). Each container 4 is in the form of a bottomed cylinder having a bottom shaped as a rectangle, circle, or oval, and is constructed to facilitate loading or discharging of articles and separation by guides (discussed later). The bottom of each container 4 has a magnetic body 5 embedded therein for being attracted and retained when the container 4 is to be collected.

A receiver 6 extends around the weighing machines 3 and is movable up and down for placing the containers 4 onto the weighing saucers 2. The receiver 6 comprises a pair of parallel support bars 7, 7 extending along and on opposite sides of the automatic weighing apparatus 1, and a plurality of guide rods 8 projecting upwardly from the support bars 7, 7 and located between the weighing saucers 2, and a plurality of guide plates 9 extending perpendicularly to the support bars 7, 7 and secured at ends to the guide rods 8 which extend through the guide plates 9. The support bars 7, 7 and the guide plates 9 jointly define a plurality of windows 10 spaced from each other at equal intervals and large enough to allow the weighing saucers 2 to pass respectively therethrough. The guide rods 8 and the guide plates 9 jointly define spaces for accommodating the containers 4 respectively therein. The receiver 6 has front and rear ends affixed to the distal ends of vertically movable piston rods of cylinders 11, 11, as shown in FIG. 2, the receiver 6 being normally in a position above the weighing saucers 2. When the containers 4 are placed on the guide plates 9, the receiver 6 is lowered past the weighing saucers 2 during which time the containers 4 are transferred from the guide plates 9 onto the weighing saucers 2. Upon completion of a weighing operation, the receiver 6 is raised past the weighing saucers 2 while receiving the containers 4 from the weighing saucers 2 onto the guide plates 9. A stock table 12 is disposed alongside of and extends parallel to the automatic weighing apparatus 1, the stock table 12 being composed of a plurality of parallel slide bars 13 extending in the longitudinal direction of the stock table 12. The stock table 12 serves to stock thereon eleven containers 4 which are one more than the weighing machines 3a through 3j of the automatic weighing apparatus 1. Therefore, one of the containers 4 stocked on the stock table 12 constitutes a dummy container which will not be supplied to the weighing machines 3. A pusher conveyor 14 such as a belt conveyor is positioned rearward of the stock table 12 for pushing the containers 4 with articles contained therein successively onto the stock table 12. A first stopper 15 is mounted on a front end of the stock table 12 for positioning the containers 4 on the stock table 12. A charging mechanism 16 is located alongside of the stock table 12 and comprises a plurality of charging or pushing cylinders 17 which are as many as the weighing machines 3a through 3j of the automatic weighing apparatus 1 and are positioned in alignment with the containers 4 arrayed on the stock table 12. No charging cylinder however is provided in the position corresponding to the dummy cylinder. The charging mechanism 16 actuates those charging cylinders 17 which or move the containers 4 onto the weighing machines 3 that are selected as a result of combinatorial arithmetic operations effected by the automatic weighing apparatus 1.

A discharge conveyor 18 is positioned alongside of the automatic weighing apparatus 1 remotely from the stock table 12 for attracting, retaining and transporting the containers 4 as they are discharged from the automatic weighing apparatus 1. The discharge conveyor 18 comprises an endless belt 20 travelling around magnet pulleys 19, 19 and a web-shaped magnet 21 disposed below an upper run of the belt 20 and having the same length as that of the automatic weighing apparatus 1 for attracting the containers 4 onto the belt 20. Another web-shaped magnet 26 extends beween magnet pulleys 19, 19 below a lower run of the belt 20. The containers 4 are fed along by the discharge container 18 with the magnetic bodies 5 being magnetically attracted to the magnetic pulleys 19, 19 and the web-shaped magnets 21, 26. Those containers 4 which are emptied by discharging the articles are transferred rearward and collected. A collector table 22 is positioned in the discharge conveyor 18 and lies flush with the upper run of the belt 20 thereof, the collector table 22 being composed of a plurality of parallel slide bars 23. The upper run of belt 20 of the discharge conveyor 18 travels around rollers 27, 28 below the collector table 22. A second stopper 24 is mounted on a front end of the collector table 22 for positioning the containers 4 as they are fed onto the collector table 22 from the rear portion of the discharge conveyor 18. A pusher mechanism (not shown) is located alongside of the collector table 22 for pushing back the containers 4 as they are stopped onto the pusher conveyor 14 over and across a slide plate 25 interposed between the collector table 22 and the pusher conveyor 14.

Operation of the automatic weighing apparatus 1 thus constructed is as follows. The containers 4 with articles contained therein are successively placed on the pusher conveyor 14, or articles are put into the conveyors 4 placed on the pusher conveyor 14. The containers 4 are then transferred by the pusher conveyor 14 successively onto the stock table 12 as they are pushed forward by the following ones. The containers 4 are stopped by the first stopper 15 and arrayed in abutting relation on the stock table 12. When a predetermined number of such containers 4 are stocked on the stock table 12, the charging cylinders 17 of the charging mechanism 16 are actuated to push the containers 4 off the stock table 12 onto the guide plates 9 of the receiver 6 along the guide rods 8, so that the containers 4 are distributed at suitable intervals. At the time of initiating weighing operation, all of the charging cylinders 17 of the charging mechanism 16 are actuated to charge all of the containers 4 on the stock table 12 except the dummy container onto the receiver 6. The dummy container 4 also contains articles, and thus plays dummy only momentarily.

When the containers 4 have been charged onto the receiver 6 and the charging cylinders 17 have been retracted, another group of containers 4 with articles put therein is supplied from the pusher conveyor 14 onto the stock table 12 on which the containers 4 are arrayed in abutting relation.

Upon the pushing of the containers 4 onto the receiver 6, the cylinders 11, 11 are actuated to withdraw their piston rods to lower the receiver 6 below the weighing saucers 2 of the weighing machines 3a through 3j, respectively, until the containers 4 are transferred onto the weighing saucers 2. Thereafter, the articles contained in the containers 4 are weighed by the weighing machines 3a through 3j, and weight values are supplied to the electronic arithmetic processer in the automatic weighing apparatus 1. The electronic arithmetic processer adds desired ones or a predetermined number of all of such weight values, compares the sums with a weight setting through a combinatorial arithmetic operation, and selects an optimum weight combination which is equal to or closest to the weight setting. When the weight combination has been selected, the cylinders 11, 11 are actuated again to raise the piston rods to lift the receiver 6 until the latter receives the containers 4 while moving up past the weighing saucers 2.

When the receiver 6 stops at its upper limit, those charging cylinders 17 which correspond to the selected weighing machines, for example, the weighing machines 3a, 3c, 3e, 3f, 3h, 3j, are actuated to charge or move the containers 4 onto the receiver 6 positioned above the weighing machines 3a, 3c, 3e, 3f, 3h, 3j while the selected containers 4 are simultaneously discharged onto the discharge conveyor 18 by the newly charged containers 4.

The discharged containers 4 are attracted and retained by the discharge conveyor 18 and fed forward thereby, and are turned upside down to discharge the articles which are sent as a weighed batch to a next processing step. The empty containers 4 are transported rearward while being attracted to the belt 20 of the discharge conveyor 18.

As the containers 4 are selectively charged, there are left spaces between adjacent remaining containers 4 on the stock table 12. When the next group of containers 14 is pushed by the pusher conveyor 14 onto the stock table 12, the pushed containers 4 displace the remaining containers 4 in an array forward on the stock table 12.

When the containers 4 are supplied onto the stock table 12, the cylinders 11, 11 are actuated to retract their piston rods to lower the receiver 6 to place the containers 4 onto the weighing saucers 2 of the weighing machines 3a through 3j for a next weighing operation. In such a next weighing operation, those weighing machines 3b, 3d, 3g, 3i which have not been selected in the previous combinatorial weighing operation do not make new weight measurements, but produce weight values previously measured. Such weight values and those of the articles in the newly charged containers 4 are subjected to a combinatorial arithmetic operation in the electronic arithmetic processer, and an optimum combination is selected which is equal to or closest to the weight setting. After such an optimum combination has been selected, the foregoing operation is repeated to charge new containers 4 from the stock table 12 onto the selected weighing machines, and the selected containers 4 are discharged by the newly charged containers 4 onto the discharge conveyor 13. The discharge conveyor 13 transports the discharged containers 4 from which the articles are discharged.

The empty containers 4 are attracted to the lower run of the discharge conveyor 18 and fed along rearward. While they are being transported back, they are cleaned, for example, and are placed on the collector table 22 at a rear portion of the discharge conveyor 18. The empty containers 4 are successively pushed forward on the collector table 22 until they are stopped by the second stopper 24. The empty containers 4 as they are stopped are pushed sideways by the pusher mechanism back onto the pusher conveyor 14 across the slide plate 25. The empty containers 4 on the pusher conveyor 14 are then supplied with articles and transported again onto the stock table 12 for subsequent weighing operation.

With the automatic weighing apparatus of the invention, the stock table 12 stocks thereon the containers 4 which are one more than the weighing machines 3a through 3j, and the central container 4 serves as a dummy container which is not supplied to the weighing machines 3 with the other containers being positioned forward and rearward of such a dummy container. The dummy container serves to take up a dimmensional or alignment difference between the containers 4 and the weighing machines 3a through 3j with the result that the containers 4 will be positioned closer to the weighing machines 3a through 3j. The containers 4 can be charged onto the respective weighing machines 3a through 3j simply by being pushed off the stock table 12 by the charging cylinders 17. When the containers 4 are moved between the adjacent guide rods 8 of the receiver 6, the containers 4 are guided thereby so as to be positionally corrected and distributed reliably into proper positions. The dummy container is displaced by successively supplied containers 4 in a next weighing operation, and thus can be a normal container 4 which will be supplied to the corresponding weighing machine, and the container which comes to a central position on the stock table 12 then becomes a dummy container in the next weighing operation. Accordingly, the containers can immediately be arranged into an array ready for being charged onto the weighing machines 3a through 3j even when the containers on the weighing machines are randomly selected as a result of a combinatorial weighing operation.

While in the illustrated embodiment only one dummy container is provided for the ten weighing machines 3a through 3j, the present invention is not limited to such an arrangement, but a plurality of dummy containers may be included dependent on dimensional differences between the weighing machines and containers. Furthermore, the weighing machines may be provided in any desired number instead of ten.

With the arrangement of the present invention, as described above, a dimensional difference or alignment difference between the weighing machines and the containers placed on the stock table can be taken up by a dummy container on the stock table. Therefore, the containers to be charged can be located closer to the weighing machine no matter how many there are weighing machines. The containers do not need to be spaced positively by a mechanical means, but can be separated out of mutual contact simply by the guide rods and supplied onto the weighing machines at suitable spacings in a short period of time.

Although a certain preferred embodiment has been shown and described in detail, it should be understood that many changes and modifications may be made therein without departing from the scope of the appended claims.

What is claimed is:

1. A container distributing and charging apparatus, comprising:
    a plurality of arrayed weighing machines;
    a stock table, disposed alongside said weighing machines, for supporting an array of containers with articles contained therein;
    means for guiding the containers in mutually spaced relation from said stock table onto those weighing machines which are selected as a result of a combinatorial weighing operation for previously discharged containers, said means for guiding comprising a guide plate corresponding to each weighing machine and having a guide portion, each of the containers having rounded corner portions and being separated from each other by the guide portion of said guide plate as the containers move onto said weighing machines, with at least one of the containers arrayed on said stock table serving as a dummy container which is kept from being moved onto a weighing machine; and
    means for pushing the selected containers in mutually spaced relation from said stock table onto selected weighing machines to thereby discharge the weighed containers therefrom.

2. A container distributing and charging apparatus according to claim 1, wherein said plurality of weighing machines and guide plates are arrayed linearly.

3. A container distributing and charging apparatus according to claim 2, wherein at least one location between said linearly weighing machines and guide plates is provided with a spacing into which the dummy container is kept from being pushed.

4. A container distributing and charging apparatus according to claim 3, wherein said spacing is provided approximately centrally of said linearly arrayed weighing machines and guide plates.

5. A container distributing, charging and weighing apparatus, comprising:
    a discharge conveyor;
    weighing machines adjacent said discharge conveyor from which selected weighed containers are pushed;
    lifting means, located around said weighing machines, for raising and lowering all the containers on the lifting means onto and off of the weighing machines for weighing, and for receiving containers pushed thereon;
    pushing means for pushing selected containers;
    selecting means, operatively connected to said pushing means and said weighing machines, for selecting containers for pushing in accordance with a predetermined target weight; and
    a stock table, between and adjacent to said lifting means and said pushing means, said pushing means pushing the selected containers off said stock table and onto said lifting means, the pushed selected containers pushing the weighed containers off of the lifting means onto said discharge conveyor, said stock table holding at least one more container than the number of said weighing machines, the at least one more container causing the substantial alignment between the remaining containers on said stock table and said weighing machines.

6. An apparatus according to claim 5, wherein said lifting means includes guide means for guiding the pushed containers onto said lifting means over each weighing machine.

7. An apparatus according to claim 6, wherein said guide means comprises guide plates and guide rods for guiding the containers over the weighing machines from said stocker table.

8. An apparatus according to claim 7, wherein said pushing means comprises pusher cylinders, wherein said weighing machines, pusher cylinders and associated guide plates and guide rods are divided into at least two groups and the groups are separated by an alignment space and the at least one more container is positioned on said stocker table adjacent the alignment space in a non-pushable location.

* * * * *

UNITED STATES PATENT AND TRADEMARK OFFICE
CERTIFICATE OF CORRECTION

PATENT NO. : 4,487,277

DATED : December 11, 1984

INVENTOR(S) : Morita et al.

It is certified that error appears in the above-identified patent and that said Letters Patent is hereby corrected as shown below:

Col. 4, line 36, after "which" insert --charge--.

Signed and Sealed this

Sixteenth Day of July 1985

[SEAL]

Attest:

DONALD J. QUIGG

Attesting Officer     Acting Commissioner of Patents and Trademarks